United States Patent
Leger

Patent Number: 5,846,277
Date of Patent: *Dec. 8, 1998

[54] METHOD FOR DETERMINING THE OPTIMUM SHAPE TO BE CONFERRED ON A THIN MOVABLE PLATE INCLUDING GIVING THE PLATE A SUBSTANTIALLY THREADED SHAPE WITH A FINITE PITCH

[75] Inventor: Michel Leger, Rueil-Malmaison, France

[73] Assignee: Institute Francais du Petrole, Rueil-Malmaison, France

[*] Notice: This patent issued on a continued prosecution application filed under 37 CFR 1.53(d), and is subject to the twenty year patent term provisions of 35 U.S.C. 154(a)(2).

[21] Appl. No.: 602,572

[22] Filed: Feb. 14, 1996

[30] Foreign Application Priority Data

Feb. 14, 1995 [FR] France ................................ 95 01752

[51] Int. Cl.$^6$ .......................... C03B 19/00; C03B 23/00; G06F 17/50
[52] U.S. Cl. ................. 65/17.1; 65/29.1; 65/106; 65/111
[58] Field of Search .............. 65/106, 107, 102, 65/111, 17.1, 29.1, 64

[56] References Cited

U.S. PATENT DOCUMENTS

| | | | |
|---|---|---|---|
| 5,226,942 | 7/1993 | Letemps et al. | 65/106 |
| 5,236,487 | 8/1993 | Letemps et al. | 65/106 |
| 5,562,750 | 10/1996 | Letemps et al. | 65/106 |
| 5,626,642 | 5/1997 | Letemps et al. | 65/106 |

OTHER PUBLICATIONS

Farin, G., "Curves and Surfaces for Computer Aided Geometric Design—A Practical Guide", Second Edition, Academic Press, Inc., pp. 202–207, 250–251, 272–277, 290–293.

Fletcher, R., "Practical Methods of Optimization", Second Edition, John Wiley & Sons, pp. 110–117.

Curves and Surfaces in Geometric Design, 1994, Wellesley MA US pp. 293–300; Leger, et al "Least–Squares Optimization of Thread Surfaces".

Computer Aided Design, vol. 21, No. 7, Sep. 1989, London, GB, pp. 421–429; Markot, et al "Solutions of Tangential Surface and Curve Intersections".

Proceedings Symposium on Interactive 3D Grahics, Mar. 29, 1992, Cambridge, Mass., US, pp. 101–108; Fowler, "Geometric Manipulation of Tensor Product Surfaces".

*Primary Examiner*—Steven P. Griffin
*Attorney, Agent, or Firm*—Antonelli, Terry, Stout & Kraus, LLP

[57] ABSTRACT

The method relates to an optimizing method for determining the optimum shape of plates such as sheets of sheet metal, panes of glass, or other thin objects designed in particular to retract completely in order to leave a clear opening. To simplify the use of shaped plates that have already been predesigned, they are modified such that their shapes coincide substantially with a "screwable" surface chosen from the wide variety of existing surfaces that meet screwability criteria and can hence move in the space without changing position, except for their edges. Implementation of the method allows the various constraints that may exist in the design of such plates to be met.

5 Claims, 1 Drawing Sheet

METHOD FOR DETERMINING THE OPTIMUM SHAPE TO BE CONFERRED ON A THIN MOVABLE PLATE INCLUDING GIVING THE PLATE A SUBSTANTIALLY THREADED SHAPE WITH A FINITE PITCH

The present invention relates to a method for determining the optimal shape to be conferred on a plate or the like, displaceable relative to a wall or in a tight space The method applies to shaped plates such as sheet metal, panes of glass, or other thin objects designed to be moved in a tight space, and particularly to retract altogether in order in particular to leave a clear opening.

The method applies in particular to optimizing the shapes of plate glass windows in motor vehicles in order to simplify the design of body parts including these windows.

The method according to the invention can easily be implemented in known CAD/CAM (computer-assisted design and manufacturing) systems. Initially, CAD (computer-assisted design) techniques at work stations allow bodies to be designed in accordance with various requirements: comfort, aerodynamics, esthetics, etc. Drawings of surfaces composed of various elements are prepared, some of which represent retractable plates such as windows. These surface elements are generally modeled by conversion functions which combine a pair of curvilinear coordinates (u, v) in the interval (0, 1) with three Cartesian coordinates (x, y, z) defining the position in space of each point in the surface; these functions are often termed "splines" by specialists.

In current industrial practice, movable windows in automobiles have simple shapes (FIG. 1). They are plane or in the shape of a cylinder with a circular base (FIG. 3). This choice of shapes imposes relatively severe constraints on automobile stylists when designing bodies.

Another source of difficulties for stylists is the shaping of the tracks of automobile doors that guide the movable windows such that, while they slide, no gaps appear on the sides. This constraint is imposed for safety reasons to prevent the hands of children for example from being trapped between the edges of the windows and their tracks in a space which closes as the window slides up (FIG. 5).

M. Láger et al. in the article entitled "Least-Squares Optimization of Fault Surfaces Using Rigid Block Approximation" in *Geophysical Journal International* describe a method allowing definition of a criterion of "screwability" of surfaces as part of the study of formation of geologic faults when rigid blocks slide past each other without deformation.

By analogy to a thread in mechanical engineering, any surface that has the property of "screwability," namely can move in space while retaining the same position, or can slide tangentially to itself, is designated a "thread." In movements of this type, only the edges move. In mathematical terms it is said that the threads are invariant in one family with one parameter of movements. An example is the thread of a bolt and a nut. They can slide into each other with one contact surface which is their common edge and which remains so in a screwing movement.

This article shows that for a thread there is a non-zero twistor T which is tangential to the surface at all points, with twistor being defined as a vector field such that:

$T(B)=T(A)+\Omega \times AB$ for any pair of points A, B in Euclidian space R. Vector $\Omega$ is the same everywhere in space. If $\Omega \neq 0$, a thread axis is defined which is the set of points such that $T(A)=\mu\Omega/2\Pi$, where $\mu$ is the thread pitch. Depending on whether $\mu>0$ or $\mu<0$, the pitch is righthand or lefthand.

The optimization method according to the invention allows the optimum shape to be determined for thin movable plates, particularly windows, for example windows designed to be moved near at least one curved wall or in a tight space delimited by two curved walls opposite each other such as the interior of a car door for example.

It is characterized by giving the plate essentially a threaded shape by requiring that it meet a screwability criterion.

The method comprises for example predefinition of the shape of the plate as a function of imposed constraints in order to obtain an initial surface, and the choice of a type of thread that minimizes the modifications to be made to this initial surface.

If, in particular, the surface of the plate is predefined by coefficients defining the function connecting the curvilinear coordinates of points on the surface to their Cartesian coordinates, a twistor T is defined by other coefficients and the values of all these coefficients are defined to minimize a cost function measuring the space between the initial surface and a surface meeting the screwability criteria.

The method proposed contributes to giving automobile stylists greater design freedom since there is a far wider variety of possible shapes meeting the screwability criterion than the classical cylindrical shapes. A stylist can thus easily find the shape best suited for body elements that are being fabricated, and hence more easily respect the numerous constraints of aerodynamics and esthetics that are usually imposed on him, without fabrication or operation being complicated or costs substantially increased thereby.

In the case where, moreover, the optimized plate meeting the screwability criterion must cooperate during operation with lateral guide elements, these guide elements can be given a helical shape, with the axis and pitch of the helix being chosen as a function of the optimized plate shape to avoid the creation of a gap.

This particular design of guide elements can contribute to increasing the safety of passengers in a vehicle, particularly young children.

The invention also relates to a method of fabricating a thin, movable plate such as a window designed to be moved in the vicinity of at least one curved wall, which is characterized by comprising the use of shaping means for this plate, which give it essentially the shape of a thread.

It also relates to a device for guiding an optimized movable plate, as defined above, which is characterized by having helically shaped lateral guide elements, the axis and pitch of the helix being chosen as a function of the shape of the optimized plate in order substantially to eliminate any lateral gap between the edges of the optimized plate and these guide elements.

The invention also relates to a method of fabricating a thin curved plate designed to move in the vicinity of at least one curved wall or in a narrow space delimited by two curved walls opposite each other, characterized by making a matrix or mold for forming said plate, such that the plate produced from this matrix or this mold has the shape of a thread.

Other characteristics and advantages of the method according to the invention and its applications will emerge from reading the description hereinbelow of embodiments described as nonlimiting examples, with reference to the attached drawings wherein.

Figure 1:
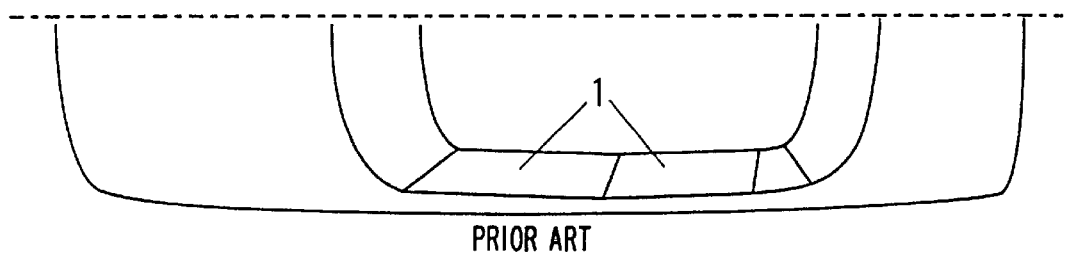
FIG. 1 shows schematically a top view of a lateral body part with simply-shaped movable windows.
Figure 2:
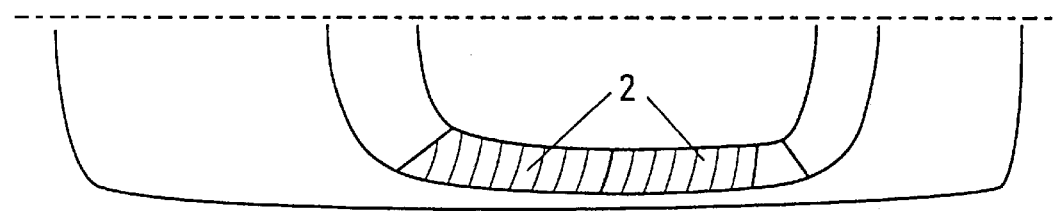
FIG. 2 is a similar view wherein the windows are shaped in accordance with the method of the invention.
Figure 3:
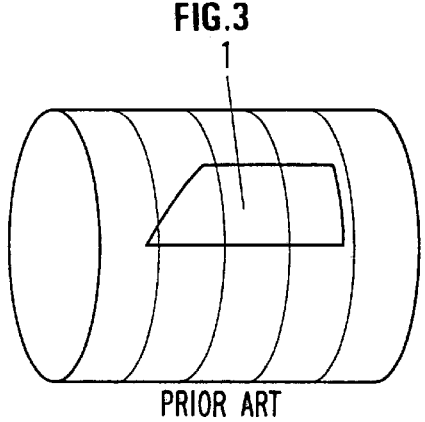
FIGS. 3 and 4 show a cylindrical movable window and a thread-shaped window, respectively.

The goal of the method according to the invention is to optimize the shapes of thin movable elements such as plates or windows obtained by known CAD/CAM techniques. It applies in particular to optimization of the movable side windows 1 of automobiles (FIG. 1) which are generally either plane or cylindrical with circular bases as shown in FIG. 3.

The method applies to initial surface elements (plane or cylindrical for example in practice) that have been premodeled by techniques in use in the CAD/CAM area, and translated by conversion functions or splines.

The goal is to modify the surfaces obtained by requiring that they be "threads" and thus meet the strictest possible screwability criterion and also that they remain as close as possible to the initial surfaces.

A vector is considered whose components are parameters: the coefficients of the coordinate conversion function (or spline) and the six coefficients of a twistor T.

Defined in a more formal and more rigorous manner, the method consists of finding components of the vector which minimizes the cost function Q:

$$Q = Q1 + wf \cdot Qf + wn \cdot Qn \qquad (1)$$

where wf and wn are the weighting factors for partial cost functions Qn and Qf.

Here, Q1 is a cost function measuring the gap between the desired thread surface and the initial surface, expressed as:

$$Q1 = (\tfrac{1}{2}) \cdot \|P - P1\| \text{ where:} \qquad (2)$$

P1 designates the coordinates or parameters of the vector at the end of the initial phase, P designates the desired quasi-thread parameters after the optimization process, and $\|P-P1\|$ designates the norm of vector (P−P1).

Qf measures the discrepancy from a perfect thread and is defined by the expression:

$$Qf = (\tfrac{1}{2}) \cdot \int <N(P) \cdot T(P)> dS \qquad (3)$$

where T and N designate respectively, at each point on the surface S, the vector of the twistor and the unitary normal to this surface.

Finally, Qn is a cost function which prevents twistor T from being canceled and is defined by the relationship:

$$Qn = (\tfrac{1}{2}) \, (\int \|T\| dS - f) \qquad (4).$$

By minimizing Qn one compels the modulus of twistor T to be close to 1. The surface described by the coordinates or parameters of vector P defining the surface will be a compromise between the Qf and Q1 criteria and, in practice, virtually a thread if the weight wf of the cost function Qf is sufficient.

Determination of the parameters of vector P defining the surface, which minimize the cost function, can be determined by various known algorithms and in particular according to the Gauss-Newton method well known to individuals skilled in the art.

Figure 4:
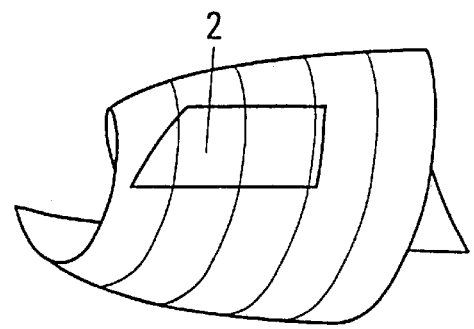
Figure 5:
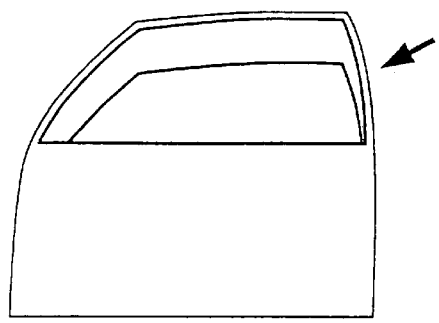
FIG. 5 shows schematically the gaps that normally appear between the inside edges of the doors and the movable windows of automobiles when they are lowered.

Once the parameters defining the surface have been determined, they can be operated by a CAD program such as the one used to define the initial plate or window. By application of the method, a premodeled surface such as the simply cylindrical window 1 of FIG. 3 is modified so that it becomes a screwable portion of surface 2 as illustrated in FIG. 4.

The method according to the invention can find another application allied to the foregoing, for example in determining the optimal shape to be given to guide elements of a thin plate that can slide in operation. It applies advantageously to the forming of the inside edges of tracks of automobile doors between which the optimized windows slide in order to improve user safety.

It will be noted that the field lines of a twistor are in fact helices. If a surface is a thread in the sense defined above, it can be considered a family of helices with the same axis and the same pitch.

Figure 6:
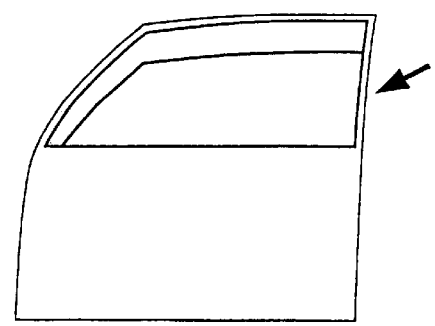
FIG. 6 shows schematically a window that can slide in its guide track without gapping in the case where the method according to the invention is applied.

The method according to the invention, applied to guidance of plates or windows in the shape of threads, consists of giving the edges in the question the shape preferably of a helix, in order that it continuously coincides as closely as possible with the edges of these plates or windows. In this way, when the window slides no gap appears (FIG. 6) in which a child's hand could be caught.

Once the geometry of the thin plates or windows has been optimized by the method according to the invention, the data concerning it can then be used in known programs controlling numerical control machines, for example for making matrices or molds for their industrial production.

I claim:

1. Optimization method for determining an optimum shape to be conferred on a thin movable plate designed to be moved adjacent at least one curved wall or in a tight space delimited by two curved walls opposite each other, comprising predefining an initial shape of the plate as a function of imposed constraints and optimizing the initial shape to give the plate an optimum shape comprising a substantially threaded shape with a finite pitch and requiring it to meet a screwability criterion.

2. Optimization method according to claim 1, wherein the optimizing step chooses the threaded shape which minimizes the modifications to be made to the initial shape.

3. Method according to claim 2, wherein the initial shape of the plate is defined by coefficients connecting curvilinear coordinates of points of the surface to Cartesian coordinates of the points of the surface, by defining a twistor (T) by other coefficients, and determining values of the coefficients to minimize a cost function measuring a space between the initial shape and a surface meeting the screwability criteria.

4. Method according to claim 1, wherein the plate that meets the screwability criterion must cooperate in operation with lateral guide elements, and the lateral guide elements are given a helical shape whose axis and pitch are chosen according to the optimum shape of the plate.

5. Optimization method according to claim 1, wherein the step of predefining an initial shape is carried out using computer-assisted-design techniques.

* * * * *